P. MONTUCCHIARO.
WHEEL HUB.
APPLICATION FILED OCT. 23, 1916.

1,286,713.

Patented Dec. 3, 1918.
2 SHEETS—SHEET 1.

Inventor
Peter Montucchiaro
By Brown, Hanson & Boettcher
Attorneys

P. MONTUCCHIARO.
WHEEL HUB.
APPLICATION FILED OCT. 23, 1916.
1,286,713.
Patented Dec. 3, 1918.
2 SHEETS—SHEET 2.
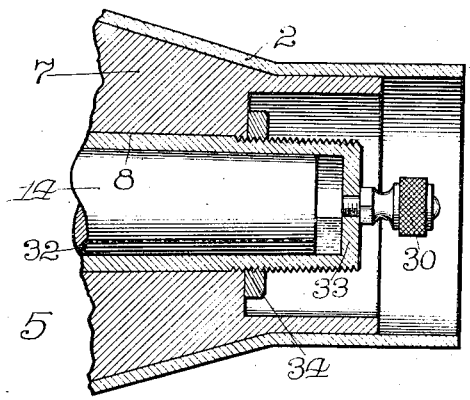
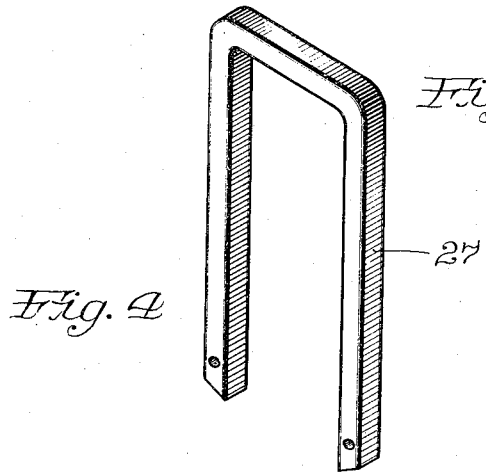
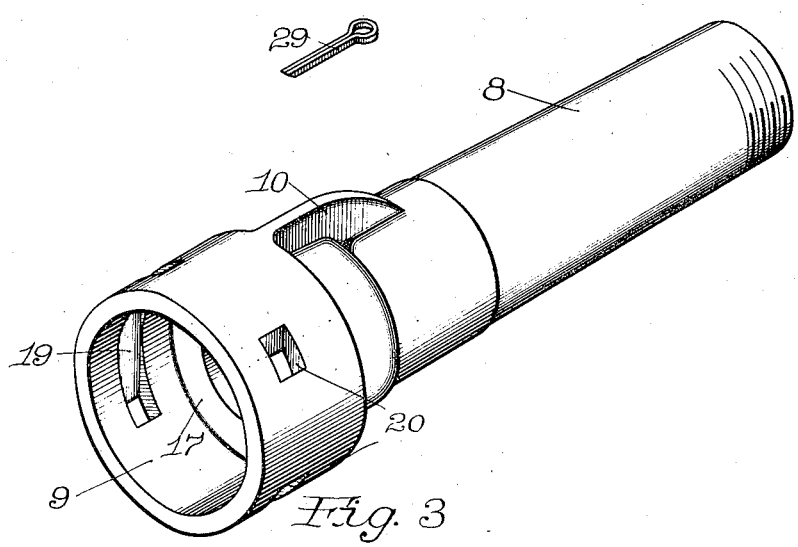
Inventor
Peter Montucchiaro
By Brown, Hanson & Boettcher
Attorneys.

UNITED STATES PATENT OFFICE.

PETER MONTUCCHIARO, OF CHICAGO HEIGHTS, ILLINOIS.

WHEEL-HUB.

1,286,713.  Specification of Letters Patent.  Patented Dec. 3, 1918.

Application filed October 23, 1916. Serial No. 127,082.

*To all whom it may concern:*

Be it known that I, PETER MONTUCCHIARO, a citizen of the United States, residing at Chicago Heights, in the county of Cook and State of Illinois, have invented a certain new and useful Improvement in Wheel-Hubs, of which the following is a full, clear, concise, and exact description, reference being had to the accompanying drawings, forming a part of this specification.

My invention relates to wheel hubs and more particularly to a hub dispensing with the usual axle nut.

I am aware that numerous devices have been heretofore proposed for obtaining a nutless hub, but with the majority of these devices some essential characteristics residing in the ordinary hub, have been sacrificed for securing this adaptation. Intricacy of mechanism is not permissible in the average wagon wheel where dirt, sand and lack of lubricant would clog its operation, nor must the hub itself be weakened by this construction. Moreover the device must be positive and allow of quick and easy removing and replacing of the wheel.

The primary object of my invention is to provide a hub, dispensing with the usual axle nut, which shall have a simple, positive locking mechanism for retaining the hub upon the axle.

A secondary object of my invention is to provide a hub, embodying the above feature, which shall be of a simple, sturdy, construction and which can be easily assembled.

Another object of my invention is the provision of improved means for excluding all dirt and grit from the spindle bearing and supplying a lubricant thereto.

Although my invention is particularly applicable to the wheel hubs of such vehicles as wagons, buggies and farming implements it is equally applicable to cycle cars, tricycles and the like, and though I have illustrated and described my invention as applied to the ordinary wooden wagon wheel I do not intend to be limited to this precise embodiment.

In the appended drawings—

Fig. 3 is a perspective view of the axle box;

Fig. 4 is a perspective view of the staple key and one of the associated cotter pins;

Fig. 5 is a fragmentary section of a modified axle box.

Figure 1:
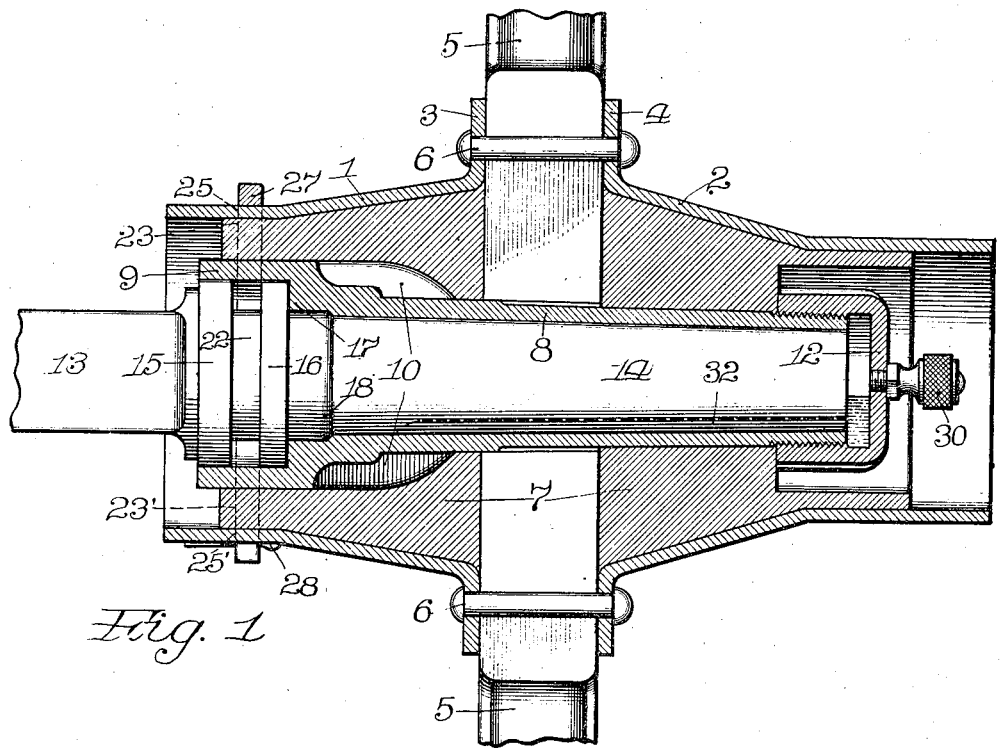
Figure 1 is a sectional view of my improved hub.
Figure 2:
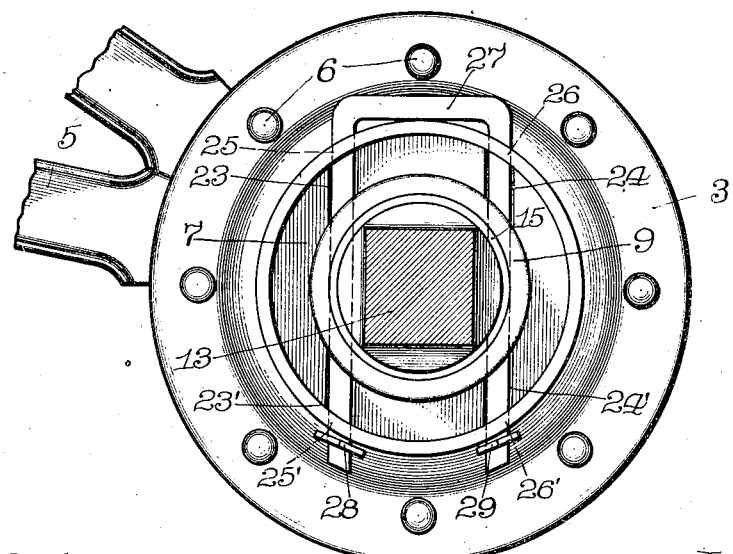
Fig. 2 is an inner end view thereof.

The hub comprises a pair of tapering shells 1 and 2 having outstanding flanges 3 and 4 at their enlarged ends between which are secured the spokes 5. Rivets 6, passing through the spoke intersections securely clamp the spokes and shells together. Each shell has packed therein a filler or core 7 of wood or any suitable material.

The axle box 8, of generally tapering contour, is formed with a large cylindrical housing 9 at the inner end, from which it is irregularly tapered to the reduced outer end. Co-extensive with the housing 9 and extending longitudinally of the box 8 are two or more splines or feathers 10, 10 which are adapted to be embedded in the filler or core 7 to insure rotation of the box 8 with the hub of the wheel. An end cap 12 is threaded upon the outer end of the box 8 and by screwing tight this cap the feathers 10, 10 are held firmly in the inner core 7; the resultant wedging action securely locking the axle box within the hub and preventing any relative rotation therebetween. The possibility of the end cap 12 working loose and being lost is slight, due to the absence of rotative movement, but if such did occur the axle box and hub could not possibly separate until the hub locking mechanism is manually released, all of which will be more fully hereinafter described.

The axle 13 bears the spindle 14 of tapered form which reposes in the tapered bore of the box 8; this tapered bearing being employed because of the facility of quick and easy mounting and demounting of the wheel. The inner end of the spindle 14 has integrally formed thereon a pair of spaced collars 15 and 16 which are normally inclosed by the cylindrical housing 9. The collar 16 bearing against the shoulder 17 in the end of the housing 9, the abutting collar 18 and the tapered spindle 14 all coöperate in receiving the outwardly acting end thrust between axle and hub such as occurs in the outer wheel in rounding curves. The collars 15 and 16 are of slightly less diameter than the interior of the housing 9 and thus the weight of the vehicle does not rest upon them but is borne solely by the spindle 14.

As shown in Fig. 3, the housing 10 is provided with two slots 19 and 20 extending entirely through the body thereof, in alinement with, and spaced apart a distance equal to the diameter of, the recess 22 between the collars 15 and 16. In the face of the core 7 are cut recesses or slots 23, 23' and 24, 24' which are alined with the slots 19 and 20 respectively and extend away therefrom in both directions. Coincident with the slots in the core are the openings 25, 25' and 26, 26' in the shell 1.

These slots and openings are brought to register when the hub is assembled and form parallel keyways for receiving the two prongs of the staple key 27. The ends of the staple key are drilled for the insertion of cotter-pins 28 and 29 which prevent the key from slipping out during rotation of the hub.

The key after being inserted in the keyways positively interlocks the hub, axle box and spindle, and as hereinbefore stated, if the end cap 12 should accidentally work off, no material harm would result as any tendency of the hub to become displaced upon the axle box would be effectively prevented by the key. This arrangement provides a simple, staunch construction. The key passes from the slots 19 and 20 in the housing 10, which act as reinforcing guides, into immediate contact with the collars 15 and 16, leaving no intervening expanse of key which might be kinked or bent by excessive strains and that the key bears on diametrically opposite surfaces of the collars and this distributes axial thrusts symmetrically without undue lateral torsion of the spindle. The large turning moment applied to the axle box from the hub is transmitted entirely through the cores and not in any degree through the key.

With reference to the means of lubrication it will be noted that the end cap 12 is internally threaded but part way, the remaining portion serving as a reservoir for lubricant which is injected through the oil cup 30 threaded into the outer face of the cap 12. During rotation of the hub the body of oil has constant connection with the longitudinal groove 32 in the spindle 14, thereby providing a constant feed of lubricant to the spindle bearing. The end cap 12 effectively prevents the entry of dirt and foreign matter to the spindle bearing from the front end of the hub and the series of collars 15, 16 and 18 abutting shoulders in the box 8 serve the same purpose at the inner end of the hub.

In the modification illustrated in Fig. 5 I have dispensed with the end cap 12 by making the axle box 8 with a closed end 33, so spaced from the end of the spindle as to provide the oil reservoir therebetween. A lock nut 34 threaded upon an external thread upon the axle box performs the function of drawing the box into the cores and binding the cores against the spoke ends. The oil cup 30 is threaded into the end 33 and supplies oil to the reservoir contained therein.

What I claim is:

In combination, a spindle, a pair of collars on said spindle, an axle box rotatably mounted on said spindle, said axle box having an enlarged housing at the inner end of the axle box inclosing said collars, a hub rigidly mounted on said axle box, said axle box and said hub having two parallel non-radial slots extending therethrough, said slots being coincident with the recess between said collars, a U-shaped key adapted to pass through said slots and be embraced between said collars, the crossbar and the ends of the prongs of said key being exposed, said key being of uniform cross section throughout, and cotter pins passing through the ends of said key prongs to prevent the accidental dislodging thereof, the key being freely removable without disturbing any other members.

In witness whereof I hereunto subscribe my name this 20th day of October, A. D. 1916.

PETER MONTUCCHIARO.